United States Patent [19]
Porter

[11] Patent Number: 4,932,698
[45] Date of Patent: Jun. 12, 1990

[54] LOG-HANDLING DEVICE

[76] Inventor: Richard B. Porter, 472 W. Berdine, Roseburg, Oreg. 97470

[21] Appl. No.: 361,597

[22] Filed: Jun. 5, 1989

[51] Int. Cl.[5] ............................................. A47J 49/00
[52] U.S. Cl. ..................................... 294/11; 294/104
[58] Field of Search ................... 294/11, 34, 103.1, 62, 294/104

[56] References Cited

U.S. PATENT DOCUMENTS

| | | | |
|---|---|---|---|
| 561,969 | 6/1896 | Craig | 294/34 |
| 972,055 | 10/1910 | Brown | 294/34 |
| 1,630,013 | 5/1927 | Hyatt | 294/11 |
| 2,137,180 | 11/1938 | Porro | 294/34 |
| 2,214,417 | 9/1940 | Horner | 294/34 |
| 4,252,357 | 2/1981 | Majors | 294/11 |
| 4,307,909 | 12/1981 | Yaworski | 294/11 |
| 4,449,743 | 5/1984 | Pankratz | 294/11 |
| 4,474,396 | 10/1984 | Dennie | 294/11 |

Primary Examiner—Margaret A. Focarino
Assistant Examiner—Joseph D. Pape
Attorney, Agent, or Firm—Norman B. Rainer

[57] ABSTRACT

A device is provided for gripping, lifting and manipulating wooden logs intended to be entered into the combustion zone of a furnace. The device has a straight rigid staff having a fixed gripping arm at its forward-most extremity. A sliding assembly, which slidably engages the staff by way of an encircling collar, is equipped with an actuator handle, a moving gripping arm, a lever portion, and two fulcrum elbows. When the actuator handle is squeezed toward the staff, the two fulcrum elbows cause the moving gripping arm to angle toward the opposed fixed gripping arm. Such action exerts holding force upon a log contacted by the two gripping arms.

4 Claims, 2 Drawing Sheets

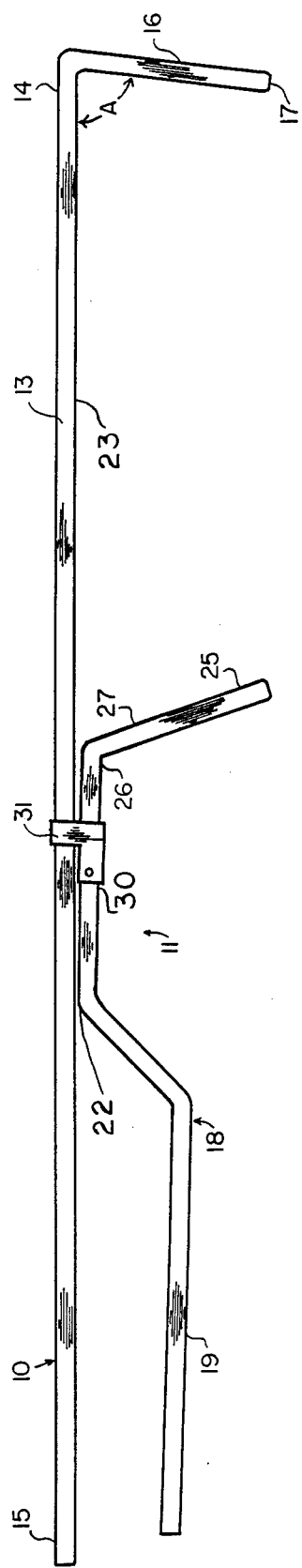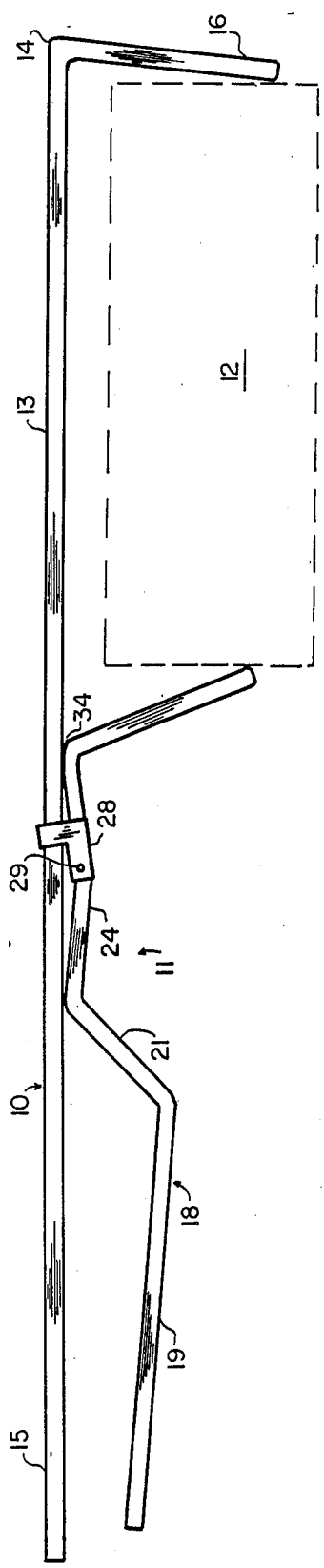
Fig. 1
Fig. 2

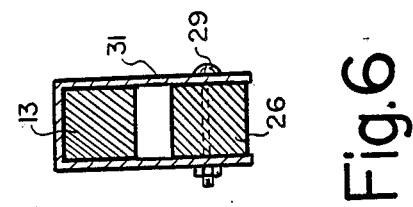
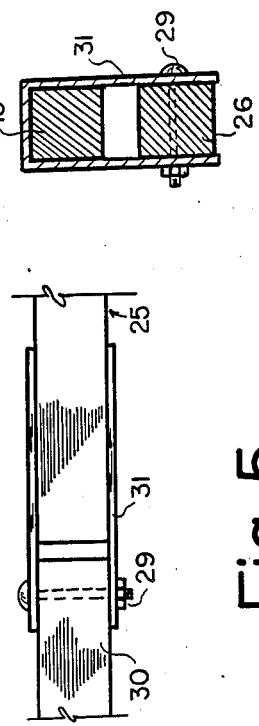
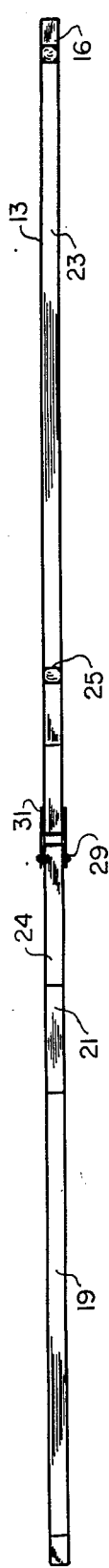
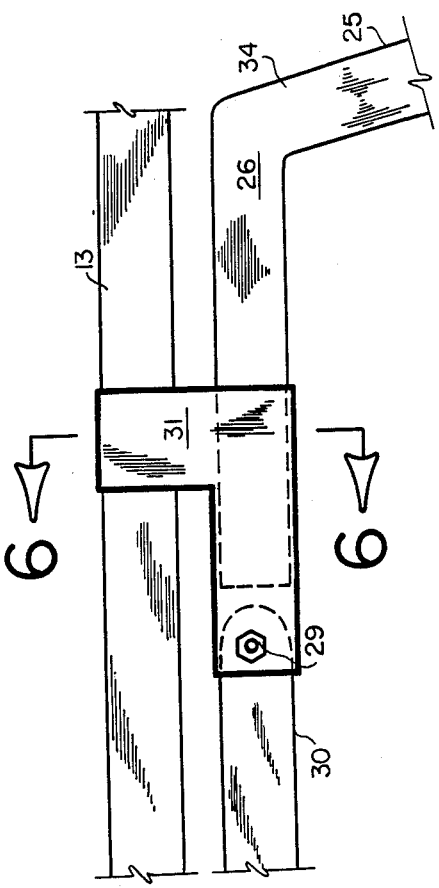

LOG-HANDLING DEVICE

BACKGROUND OF THE INVENTION

This invention concerns the handling of wooden logs which are intended to be used as fuel in a suitable combustion zone, and more particularly concerns a device for lifting such logs and inserting them into such combustion zone.

Logs intended for heating use in a fireplace, oven or stove are generally cut so as to have two substantially flat extremities that are generally perpendicular to the long axis of the log. In certain stoves designed to burn wooden logs, the combustion chamber has a configuration which is elongated from front to rear of the stove. The front extremity of the chamber is provided with a door which may be opened to permit insertion of logs. It is difficult to properly insert a log into such elongated combustion chambers, especially when the stove is hot.

If the log is carelessly entered into the stove, the leading extremity of the log will angle downwardly. This can disrupt properly stacked and efficiently burning logs. Similar disruption can occur if the newly entered log is thrown into the stove, whereby the impact and uncertain location of the new log may adversely affect the logs already burning. Careful placement of the newly entered log is difficult because considerable force must be exerted upon the trailing extremity to cause the log to be horizontal before it is released into the combustion chamber.

It is accordingly a primary object of the present invention to provide a device for securely gripping a log for careful insertion into a combustion zone.

It is another object of this invention to provide a device as in the foregoing object which enables a log to be inserted end-wise in a horizontal disposition into a wood-burning stove.

It is a further object of the present invention to provide a device of the aforesaid nature of rugged, durable construction amenable to low cost manufacture.

These objects and other objects and advantages of the invention will be apparent from the following description.

SUMMARY OF THE INVENTION

The above and other beneficial objects and advantages are accomplished in accordance with the present invention by an adjustable holder device of metal construction comprising:
(a) a rigid staff comprised of an elongated straight portion of substantially uniform cross-sectional configuration extending between forward and rear extremities, and a fixed gripping arm emergent from the forward extremity, and
(b) a sliding assembly comprising:
  (1) an actuator handle having a straight elongated portion, and a forward extremity configured to have a first fulcrum elbow and a lever portion extending forwardly of said elbow and substantially parallel to the straight elongated portion,
  (2) a moving gripping arm positioned in facing relationship with the fixed gripping arm and having a foot portion and a second fulcrum elbow,
  (3) pivot means which interengage the foot portion and lever portion, and
  (4) a collar attached to the foot portion forwardly of the pivot means and slidably embracing the elongated straight portion of the staff, whereby
(c) the sliding assembly can be moved toward the forward extremity of the staff to contact a log disposed between the fixed and moving gripping arms, and
(d) when squeezing pressure is manually applied to the actuator handle to move it toward the staff, a tensioned state is achieved wherein both fulcrum elbows are forced against the staff, causing the moving gripping arm to tilt forwardly and press tightly against the log.

In preferred embodiments of the invention, the staff is of rectangular cross-section having four face surfaces, and the sliding assembly is constrained to movement along that face of the staff from which the fixed gripping arm emerges. The gripping arms are preferably angled slightly toward each other.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a side view of an embodiment of the device.
FIG. 2 is a side view of the device of FIG. 1 shown in its tensioned state and gripping a log.
FIG. 3 is a top view of the embodiment of FIG. 1.
FIG. 4 is an enlarged fragmentary side view.
FIG. 5 is an enlarged fragmentary bottom view.
FIG. 6 is a sectional view taken upon the line 6—6 of FIG. 4.

DESCRIPTION OF THE PREFERRED EMBODIMENT

Referring to FIGS. 1-6 an embodiment of the device of the present invention is shown comprised of staff 10 and sliding assembly 11 which interact to grip log 12.

In the exemplified embodiment, staff 10 is a rigid monolithic structure fabricated of rectangular metal tubing and comprised of an elongated straight portion 13 extending between forward and rear extremities 14 and 15, respectively, and a fixed gripping arm 16 bent away from said straight portion at forward extremity 14. Said staff has four faces by virtue of its rectangular cross-sectional configuration. Gripping arm 16 is bent in the direction of one of said faces, forming therewith an acute angle A of about 80 degrees. In other embodiments, said angle may vary between about 85 and 65 degrees. It is important that the distal extremity 17 of the gripping arm, or means which may be associated therewith, such as a spike, point or teeth, be directed toward the rear extremity 15 of straight portion 13.

The sliding assembly of the exemplified embodiment is comprised of a monolithic metal actuator handle 18 having an elongated straight portion 19 disposed in facing relationship with face 23 of the staff, from which gripping arm 16 extends. Forward extremity 20 of actuator handle 18 is bent to have a dog-leg or diagonal portion 21 which leads to first fulcrum elbow 22 disposed to contact face 23. A lever portion 24 extends forwardly from elbow 22 in substantially parallel relationship to straight portion 19.

A moving gripping arm 25 is positioned in facing relationship with fixed gripping arm 16. A foot portion 26 angularly emerges from the proximal extremity 27 of gripping arm 25 as a continuous integral extension thereof and forming second fulcrum elbow 34. The distal extremity 28 of foot portion 26 is joined by pivot means in the form of pivot pin 29 to the forward extremity 30 of lever portion 24.

A collar 31, attached to foot portion 26 forwardly of pivot pin 29, slidably embraces straight portion 13 of the staff, thereby enabling the sliding assembly to be positioned upon face 23 anywhere upon straight portion 13. The collar, for greater structural strength, may extend completely around foot portion 26.

In use, a log is placed between the two gripping arms. The sliding assembly is pushed forwardly toward the fixed gripping arm so that both gripping arms touch the opposed sides or ends of the log. The user then grasps actuator handle 18 and staff 10 in one or both hands and applies squeezing force, thereby moving the actuator handle in the direction of face 23. Such action causes first elbow 22 to bear against face 23, thereby forcing foot portion 26 upwardly to cause second elbow 34 also to bear against face 23. The concerted action tilts moving gripping arm 25 in the direction of fixed gripping arm 16. The tilting effect in this tensioned state of the device applies sufficient pressure against the log such that the log can be inverted, as shown in FIG. 2.

When it is desired to release a log, squeezing force is released from the actuator handle.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An adjustable log holding device of metal construction comprising:
   (a) a rigid staff comprised of an elongated straight portion of substantially uniform cross-sectional configuration extending between forward and rear extremities, and a fixed gripping arm emergent from the forward extremity, and
   (b) a sliding assembly comprising:
      (1) an actuator handle having a straight elongated portion, and a forward extremity configured to have a first fulcrum elbow and a lever portion extending forwardly of said elbow and substantially parallel to the straight elongated portion,
      (2) a moving gripping arm positioned in facing relationship with the fixed gripping arm and having a foot portion and a second fulcrum elbow,
      (3) pivot means which interengage the foot portion and lever portion, and
      (4) a collar attached to the foot portion forwardly of the pivot means and slidably embracing the elongated straight portion of the staff, whereby
   (c) the sliding assembly can be moved toward the forward extremity of the staff to contact a log disposed between the fixed and moving gripping arms, and
   (d) when squeezing pressure is manually applied to the actuator handle to move it toward the staff, a tensioned state is achieved wherein both fulcrum elbows are forced against the staff, causing the moving gripping arm to tilt forwardly and press tightly against the log.

2. The device of claim 1 wherein said staff is of square cross-sectional configuration having four faces, and the sliding assembly is constrained to movement along that face of the staff from which the fixed gripping arm emerges.

3. The device of claim 1 wherein said collar fixedly embraces said foot portion.

4. The device of claim 2 wherein the fixed gripping arm is bent in the direction of one of said faces at an angle between 85 and 65 degrees.

* * * * *